June 8, 1926.
J. M. LOBIT
1,587,536
ANIMAL TRAP
Filed Nov. 14, 1923
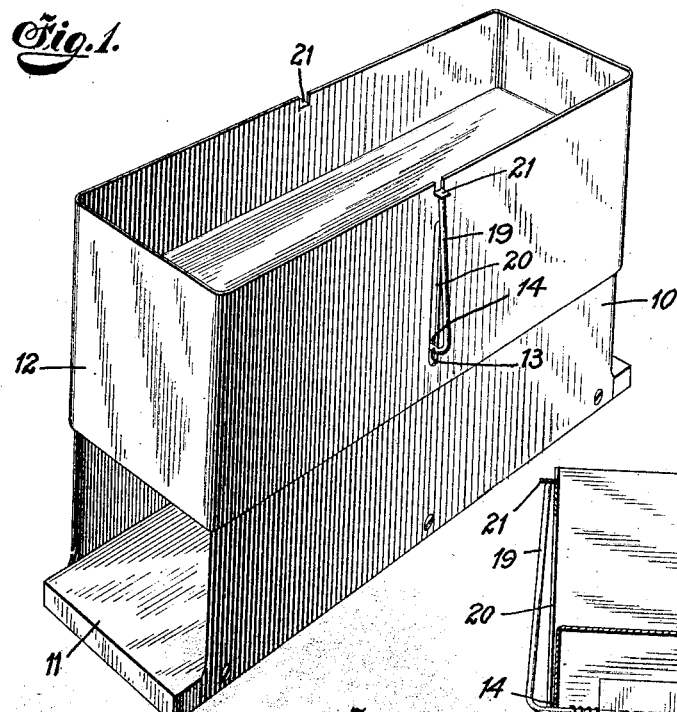
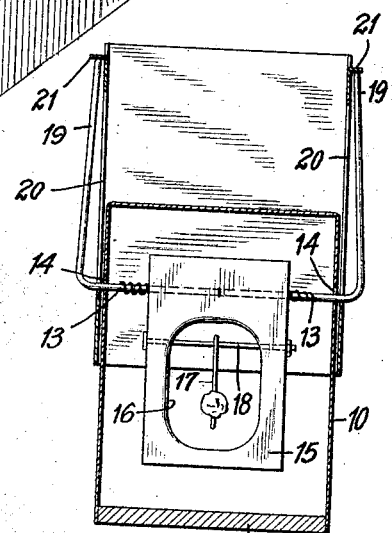
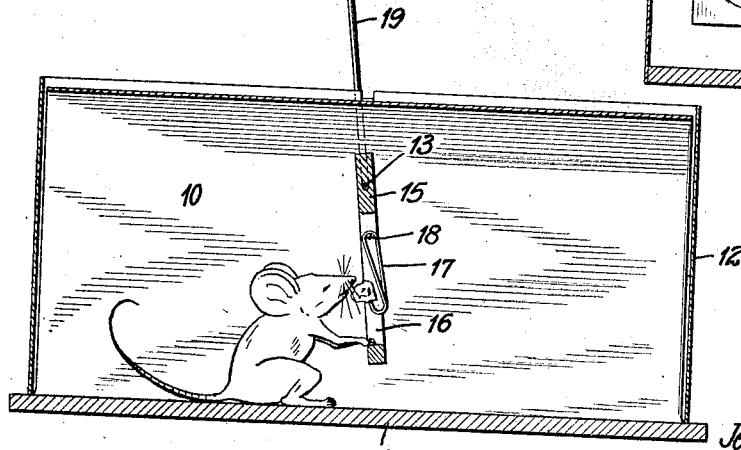
INVENTOR
Jean M. Lobit
BY
Cooper, Kerr & Dunham
his ATTORNEYS Patented June 8, 1926.

1,587,536

UNITED STATES PATENT OFFICE.

JEAN M. LOBIT, OF BROOKLYN, NEW YORK.

ANIMAL TRAP.

Application filed November 14, 1923. Serial No. 674,669.

This invention relates to animal traps. More specifically it relates to traps adapted to catch rats or mice and has for some of its objects to provide a trap which is comparatively simple in construction, which may be manufactured at a low cost, and which is reliable and effective in operation. Other objects and advantages will appear as the invention is hereinafter disclosed.
Referring to the drawings, which illustrate what I now consider a preferred form of the invention:—

Fig. 1 is a perspective view of the trap in open or set position.
Fig. 2 is a section taken substantially on the plane of the elements 13, 19 of Fig. 1.

Fig. 3 is a longitudinal sectional elevation, showing the trap in closed or actuated position.
The trap comprises a tunnel-shaped portion, consisting of an inverted trough 10 of sheet metal secured by screws or otherwise to a base 11 also preferably of metal, and a closure 12. The latter is preferably constructed of sheet metal and in the form of a rectangular box without top or bottom. Means are provided for holding the closure 12 in elevated position (Figs. 1 and 2) until released by a rat or other animal in the trap at which time the trap automatically closes. This means may be constructed substantially as follows.

A pair of rods 13, 13, are each journaled in a corresponding one of two opposite holes or openings 14, 14, provided in the opposite side walls of the tunnel member 10. Each of these rods 13, 13 is shown screw-threaded at its inner end to screw into tapped holes in a trigger 15 constructed of wood, metal, or other suitable material. The trigger 15 is shown provided with an opening 16 in which a bait-receiving hook 17 is suspended from a cross wire or rod 18 mounted in the trigger and extending across the opening 16.
Each of the rods 13, 13, which together with the trigger form a rock shaft, is provided with an upwardly extending portion 19. Each of the rods 13, 13, extends through a corresponding one of two vertically-extending slots 20, 20, provided in the opposite side walls of the closure 12. The mid-portion of the upper side edge of the closure 12 is struck up or flanged over, as indicated at 21, 21, to form projections which seat or rest upon the upper ends of the uprights 19, 19, when the trap is set, as shown in Figs. 1 and 2.

The operation of the trap is as follows. The hook 17 is baited, the parts set to the position shown in Figs. 1 and 2, and the trap placed in the desired location. A rat or mouse entering the tunnel 10 at either end and nibbling at the bait will move the trigger 15, rocking the rods 13, 13, and moving the uprights 19, 19 from under the projections 21, 21. The closure 12 then immediately drops by gravity to the position shown in Fig. 3 and the rat or mouse is trapped in a sealed metallic chamber. It will be noted that the slots 20, 20, cooperate with the rods 13, 13, to aid in guiding the closure in its descent. A trapped rat or mouse may readily be killed by submerging the trap in water. The trap may then be reset by raising the closure 12 and placing the uprights 19, 19 under the projections 21, 21.

The trap may be effectively employed without using bait. Thus it may be placed on the floor of a room adjacent a wall so that the path of travel through the tunnel 10 is parallel to the wall of the room. Rats usually run along the floor of a room adjacent a wall. A rat or mouse running into the tunnel 10 would strike the trigger 15, release the closure 12, and be entrapped, as above described, the force required to actuate the trigger and release the closure being comparatively small.

In addition to the objects and advantages set forth above it should also be noted that there is practically no chance of injury to the user of the trap. Furthermore, the trap may be placed in front of a rat hole whereby a rat entering or leaving the hole would have to pass through the tunnel and would thereby be trapped.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted without interfering with the more general results outlined, and the invention extends to such use.

What I claim is:—

1. An animal trap comprising in combination, a casing in the form of a tunnel, a closure adapted when released to seal the opposite ends of the tunnel, a normally vertical trigger mounted in the casing in the path of travel through the tunnel for pivotal movement about a substantially horizontal axis substantially at right angles to the said direction of travel, and closure-supporting means including a rigid supporting strut releasable by actuation of said trigger in either direction about its axis.

2. An animal trap comprising in combination, a tunnel-shaped casing, a closure for said casing and movable vertically with respect thereto, a rock-shaft journaled in the side walls of said casing, a trigger secured to said rock-shaft and extending into the path of travel through the tunnel, uprights on said rock-shaft, and projections on said closure and adapted to rest upon said uprights to support said closure in elevated position.

3. An animal trap comprising in combination, an open ended tunnel-shaped casing having top, bottom and side walls; a closure having side and end walls, surrounding said casing, and vertically slidable on said casing; a rock-shaft journaled in the side walls of said casing; the side walls of said closure being provided with vertical slots through which said rock-shaft extends; uprights on the outer ends of said rock-shaft; a trigger mounted on said rock-shaft within said casing; and projections on said closure and adapted to rest upon said uprights to support said closure in elevated position.

4. An animal trap comprising in combination, a tunnel-shaped casing; a closure having side and end walls, surrounding said casing, and vertically slidable on said casing; means for supporting said closure in elevated position; and means adapted to be actuated by travel of an animal through the tunnel for releasing said closure-supporting means.

In testimony whereof I hereto affix my signature.

JEAN M. LOBIT.